United States Patent
Nikulin

(10) Patent No.: US 10,669,194 B2
(45) Date of Patent: Jun. 2, 2020

(54) GLASS STRENGTHENING BY ION EXCHANGE AND LAMINATION

(71) Applicant: CORNING INCORPORATED, Corning, NY (US)

(72) Inventor: Ilia Andreyevich Nikulin, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 493 days.

(21) Appl. No.: 15/520,192

(22) PCT Filed: Oct. 22, 2015

(86) PCT No.: PCT/US2015/056862
§ 371 (c)(1),
(2) Date: Apr. 19, 2017

(87) PCT Pub. No.: WO2016/065118
PCT Pub. Date: Apr. 28, 2016

(65) Prior Publication Data
US 2017/0305788 A1    Oct. 26, 2017

Related U.S. Application Data

(60) Provisional application No. 62/067,172, filed on Oct. 22, 2014.

(51) Int. Cl.
*C03C 21/00* (2006.01)
*B32B 17/06* (2006.01)
(Continued)

(52) U.S. Cl.
CPC ............ *C03C 21/002* (2013.01); *B32B 17/06* (2013.01); *C03B 17/02* (2013.01); *C03B 17/064* (2013.01); *B32B 2457/20* (2013.01)

(58) Field of Classification Search
None
See application file for complete search history.

(56) References Cited

U.S. PATENT DOCUMENTS

| 4,214,886 A | 7/1980 | Shay et al. |
| 6,830,559 B2 | 12/2004 | Schock |

(Continued)

FOREIGN PATENT DOCUMENTS

| JP | 55152554 A | 11/1980 |
| WO | 2013065648 A1 | 5/2013 |
| WO | 2016033038 A1 | 3/2016 |

OTHER PUBLICATIONS

Gy, "Ion exchange for glass strengthening," Materials Science and Engineering B, 149 (2008) 159-165 (Year: 2008).*

(Continued)

*Primary Examiner* — David Sample
(74) *Attorney, Agent, or Firm* — Michael A. Hood; Svetlana Z. Short

(57) ABSTRACT

A laminated glass article having a core layer made from a glass that is not ion-exchangeable, and a clad layer made from a glass that is ion-exchangeable. The laminated glass article has a maximum compressive stress in the clad layer from about 0.05 GPa to about 0.7 GPa, and a compressive stress at an inner surface of the clad layer directly adjacent to the core layer from about 20% to about 45% of a compressive stress at an outer surface of the clad layer. A slope of a stress profile in the clad layer is substantially linear. Methods for manufactured such a laminated glass article also are disclosed.

9 Claims, 5 Drawing Sheets

(51) Int. Cl.
*B32B 17/02* (2006.01)
*C03B 17/02* (2006.01)
*C03B 17/06* (2006.01)

(56) References Cited

U.S. PATENT DOCUMENTS

| | | |
|---|---|---|
| 7,366,376 B2 | 4/2008 | Shishkov et al. |
| 7,952,718 B2 | 5/2011 | Li et al. |
| 8,075,999 B2 | 12/2011 | Barefoot et al. |
| 8,545,076 B2 | 10/2013 | Bickham et al. |
| 9,359,251 B2 | 6/2016 | Bookbinder et al. |
| 9,434,633 B2 | 9/2016 | Bookbinder et al. |
| 9,638,862 B2 | 5/2017 | Bhagavatula et al. |
| 2009/0076491 A1 | 3/2009 | Roschak et al. |
| 2012/0280368 A1 | 11/2012 | Garner et al. |
| 2013/0127202 A1 | 5/2013 | Hart |
| 2013/0171456 A1 | 7/2013 | Fadeev et al. |
| 2013/0204126 A1 | 8/2013 | Namati et al. |
| 2013/0236666 A1 | 9/2013 | Bookbinder et al. |
| 2013/0295357 A1 | 11/2013 | Cleary et al. |
| 2014/0141217 A1 | 5/2014 | Gulati et al. |
| 2015/0368153 A1* | 12/2015 | Pesansky .............. C03C 21/002 428/220 |

OTHER PUBLICATIONS

Pesansky et al., U.S. Appl. No. 62/014,464, filed Jun. 19, 2014 (Year: 2014).*

* cited by examiner

GLASS STRENGTHENING BY ION EXCHANGE AND LAMINATION

This application claims the benefit of priority to International Application No. PCT/US2015/056862, filed on Oct. 22, 2015, which claims the benefit of priority to U.S. Application No. 62/067,172, filed on Oct. 22, 2014, the content of each of which is incorporated herein by reference in its entirety.

BACKGROUND

Field

The present specification generally relates to laminated glass articles and, more specifically, to laminated glass articles having a clad that is ion-exchangeable and a core that is not ion-exchangeable.

Technical Background

Portable electronic devices, such as smart phones and tablets, are a growing industry. Despite using chemically strengthened glass as cover glass for portable devices, breakage of cover glass continues to be a problem encountered in the industry. Increasing the strength of glass by methods such as chemical strengthening can lead to frangibility issues in laminated glass articles when stresses in the laminated glass articles become too high.

Accordingly, there remains a need for strengthened glass articles with increased damage resistance that also are not frangible.

SUMMARY

One embodiment is directed to a laminated glass article comprising a core layer comprising a glass that is not ion-exchangeable, and a clad layer comprising a glass that is ion-exchangeable. The laminated glass article according to embodiments has a maximum compressive stress in the clad layer from about 0.05 GPa to about 0.7 GPa, and a compressive stress at an inner surface of the clad layer directly adjacent to the core layer from about 20% to about 45% of a compressive stress at an outer surface of the clad layer. A slope of a stress profile in the clad layer of the laminated glass article is substantially linear.

A second embodiment is directed to a method for manufacturing a laminated glass article comprising: laminating a core layer comprising a glass that is not ion-exchangeable with a clad layer comprising a glass that is ion-exchangeable; and chemically strengthening the laminated glass article. The laminated glass article is manufactured to have a maximum compressive stress in the clad layer from about 0.05 GPa to about 0.7 GPa, and a compressive stress at an inner surface of the clad layer directly adjacent to the core layer from about 20% to about 45% of a compressive stress at an outer surface of the clad layer opposite the inner surface. A slope of a stress profile in the clad layer is substantially linear.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Surface compressive stress and depth of the compressive stress layer (hereinafter referred to as depth of layer or DOL) are commonly used to characterize chemically strengthened glass. When calculating the stress profile, as measured by compressive stress over the DOL, it has previously been thought that the shape of the stress profile follows either a linear or a complimentary error function. However, engineering a laminated glass article as described herein enables the shape of the stress profile to be controlled and can result in a laminated glass article that has compressive stress extending deep into the article (e.g., having a large DOL).

Previously, to increase damage resistance of strengthened glass, two-step ion exchange processes were conducted, but two-step ion exchange processes generally involve complex combinations of ion-exchange bath concentration and temperature to avoid unwanted surface tension. Therefore, two-step ion exchange generally is difficult to perfect and quite costly. Additionally, heat treatments below the strain point of the glass have been used in an attempt to improve the damage resistance of strengthened glass, but this additional heat treatment increases the cost and complexity of forming the glass.

Embodiments disclosed herein address the above issues by forming laminated glass articles comprising clad layers that are ion-exchangeable and comprising a core layer that is not ion-exchangeable. Further, according to some embodiments, an ion exchange process is conducted so that high compressive stress is present deep into the glass article.

Laminated glass articles generally comprise two or more layers of glass that are fused together to form a single, unitary body. In some embodiments, a laminated glass article comprises a glass sheet. The glass sheet can be substantially planar (e.g., flat) or non-planar (e.g., curved).

In other embodiments, a laminated glass article comprises a formed or shaped glass article comprising a three-dimensional (3D) shape. For example, a formed glass article can be formed by molding or shaping a glass sheet to provide the desired 3D shape.

Figure 1:
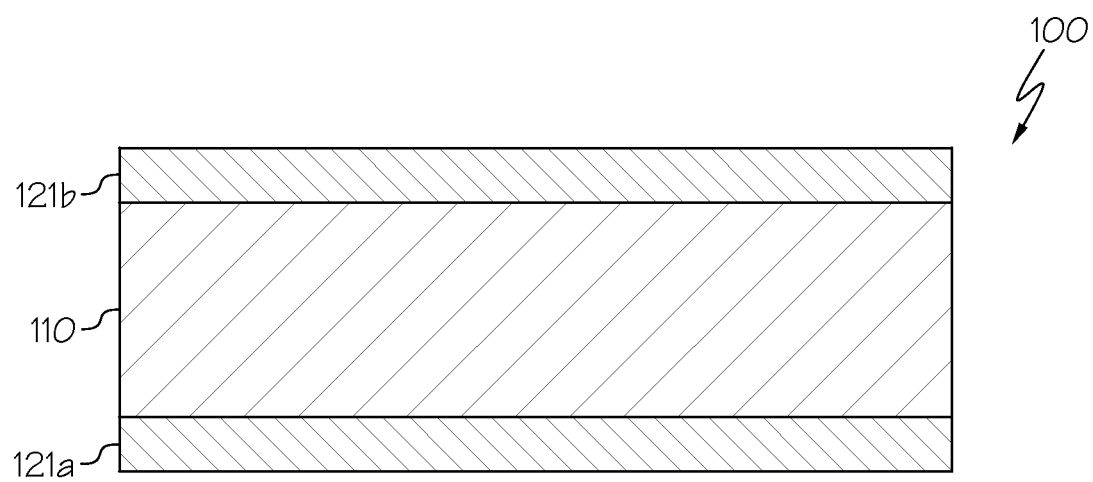
FIG. 1 schematically depicts a laminated glass article having three layers according to embodiments disclosed and described herein.

Structures of laminated glass articles according to embodiments are shown in FIG. 1, which schematically depicts a laminated glass article having three layers. In various embodiments, a glass layer can comprise a glass material, a glass-ceramic material, or a combination thereof. In the embodiment shown in FIG. 1, a laminated glass article 100 comprises a core layer 110 and clad layers 121a and 121b. In the embodiment shown in FIG. 1, the clad layers 121a and 121b have substantially the same or the same thickness. However, it should be understood that the dimensions of the core layer 110 and the clad layers 121a and 121b in FIG. 1 are illustrative only and that in other embodiments various thicknesses may be used. In embodiments, the core layer 110 comprises a glass that is not substantially ion-exchangeable or not ion-exchangeable (i.e., a non-ion-exchangeable glass), such as a glass that is free or substantially free of alkali metals. For example, the glass of the core layer 110 comprises at most about 1 mol %, at most about 0.5 mol %, at most about 0.2 mol %, or at most about 0.1 mol % alkali metals. For example, glasses that are not substantially ion-exchangeable or not ion-exchangeable include Eagle XG®, Jade™, Lotus™, or ULE® glasses all manufactured by Corning Incorporated. In embodiments, the glass of the core layer 110 comprises about 69 mol % to about 73 mol % $SiO_2$, about 5 mol % to about 9 mol % $Al_2O_3$, 0 mol % to about 3 mol % $B_2O_3$, less than about 1 mol % alkali metals, and/or about 18 mol % to about 22 mol % alkaline earth metals. One example of a glass that may be suitable for use as the core layer 110 comprises 71.22 mol % $SiO_2$, 7.72 mol % $Al_2O_3$, 0.95 mol % $B_2O_3$, 0.15 mol % $Na_2O$, 0.03 mol % MgO, 0.14 mol % CaO, 9.76 mol % SrO, 9.92 mol % BaO, 0.09 mol % $SnO_2$, and 0.01 mol % $Fe_2O_3$. In embodiments the clad layers 121a and 121b comprise a glass that is ion-exchangeable, such as a glass that comprises one or more alkali metal (e.g., a substantial amount of one or more alkali metal). For example, the glass of the clad layers 121a and 121b comprises at least about 2 mol %, at least about 5 mol %, or at least about 10 mol %, alkali metals. For example, in embodiments, the ion-exchangeable glass may be Gorilla® Glass or soda-lime silicate glass manufactured by Corning Incorporated. In embodiments, the glass of the clad layers 121a and 121b comprises about 64 mol % to about 68 mol % $SiO_2$, about 9 mol % to about 13 mol % $Al_2O_3$, 5 mol % to about 9 mol % $B_2O_3$, about 5 mol % to about 9 mol % alkali metals, and/or about 7 mol % to about 11 mol % alkaline earth metals. One example of a glass that may be suitable for use as the clad layers 121a and 121b comprises 65.68 mol % $SiO_2$, 11.26 mol % $Al_2O_3$, 7.36 mol % $B_2O_3$, 7.12 mol % $Na_2O$, 8.51 mol % MgO, and 0.08 mol % $SnO_2$. Another example of a glass that may be suitable for use as the clad layers 121a and 121b comprises 65.96 mol % $SiO_2$, 11.22 mol % $Al_2O_3$, 7.3 mol % $B_2O_3$, 6.95 mol % $Na_2O$, 6.53 mol % MgO, 1.96 mol % CaO, and 0.08 mol % $SnO_2$. Although the laminated glass article shown in FIG. 1 comprises two clad layers, it should be understood that, according to some embodiments, laminated glass articles may comprise multiple layers. For example, embodiments may include laminated glass articles that comprise 2n+1 layers, where n is the number of clad layers applied to each side of the core (for example, in the three-layered structure shown in FIG. 1, n=1 because there is one clad layer, but it is present on both sides of the core).

In some embodiments, the interfaces between the clad layer 121a and the core layer 110 and/or between the clad layer 121b and the core layer 110 (or between other adjacent glass layers) are free of any bonding material such as, for example, an adhesive, a coating layer, or any non-glass material added or configured to adhere the respective glass layers to each other. Thus, the clad layers 121a and 121b are fused or applied directly to the core layer 110 or are directly adjacent to the glass core layer 110. In some embodiments, the laminated glass article comprises one or more intermediate layers disposed between the core layer 110 and the clad layers 121a and 121b. For example, the intermediate layers may comprise intermediate glass layers and/or diffusion layers formed at the interface of the core layer 110 and the clad layers 121a and 121b (e.g., by diffusion of one or more components of the glass core and glass cladding layers into the diffusion layer). In some embodiments, the laminated glass article comprises a glass-glass laminate (e.g., an in situ fused multilayer glass-glass laminate) in which the interfaces between directly adjacent glass layers are glass-glass interfaces.

The laminated glass article of embodiments, such as laminated glass article 100 above, may be formed using an overflow fusion process, such as the process disclosed in U.S. Pat. No. 4,214,886, which is incorporated herein by reference in its entirety.

Figure 2:
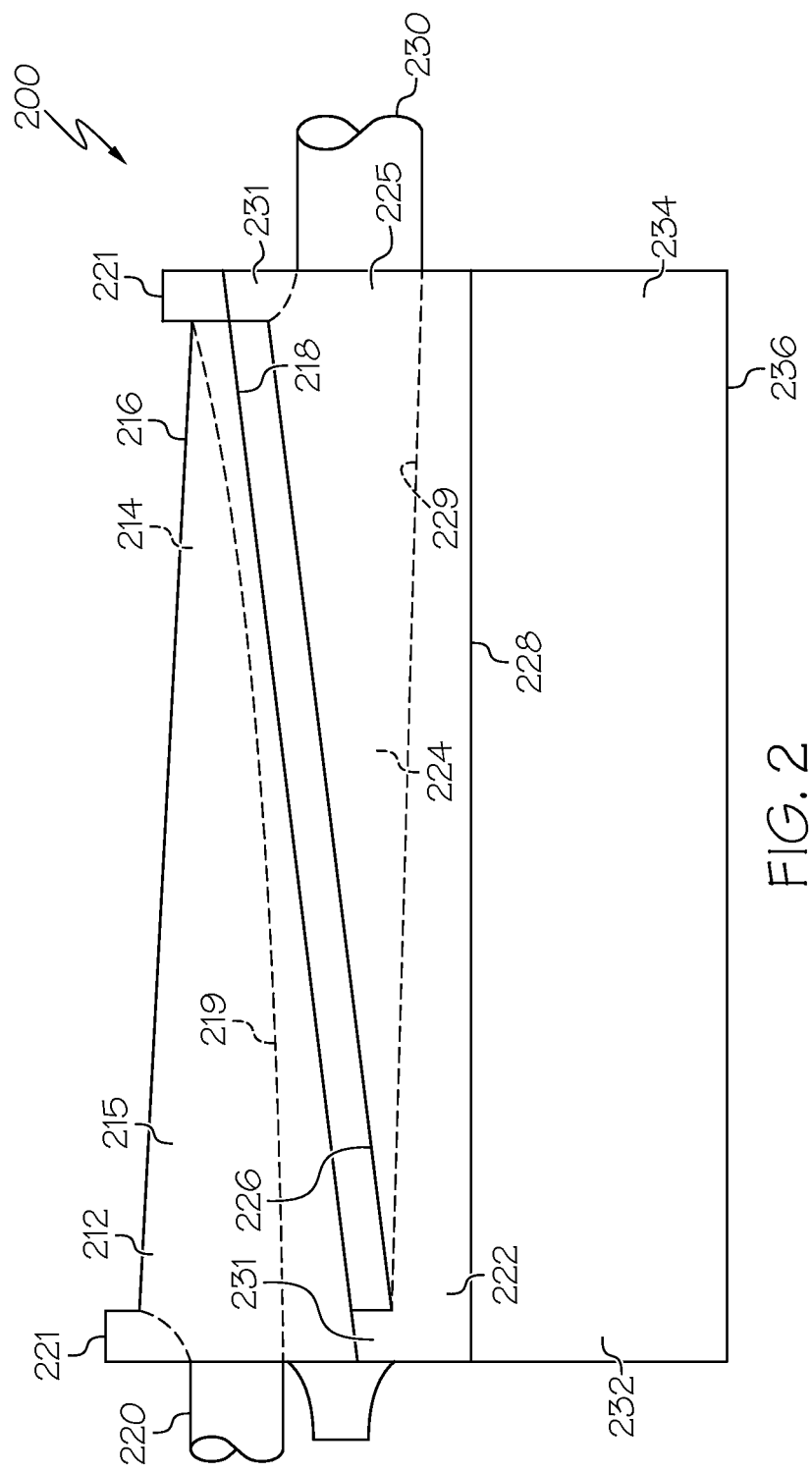
FIG. 2 schematically depicts an apparatus for forming a laminated glass article according to embodiments disclosed and described herein.
Figure 3:
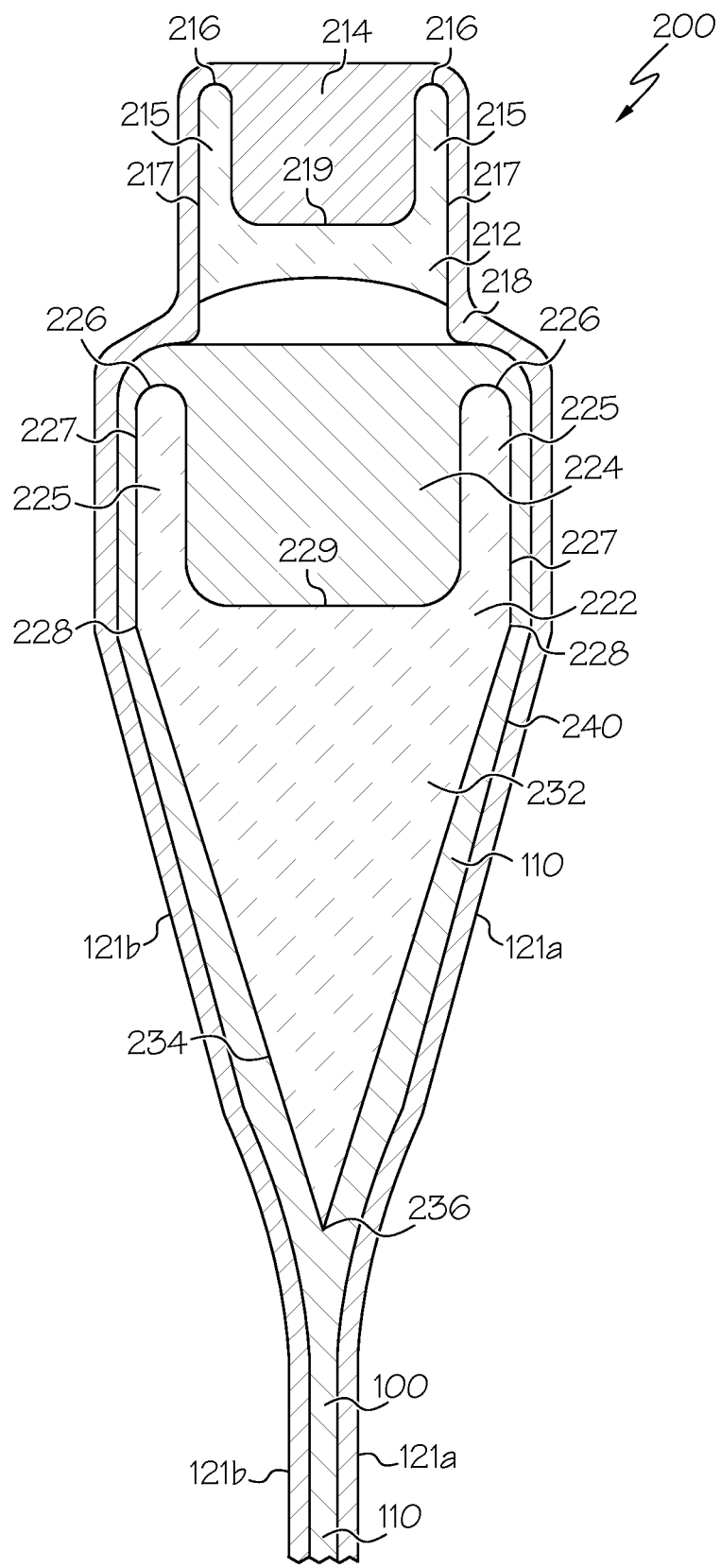
FIG. 3 schematically depicts an apparatus for forming a laminated glass article having three layers according to embodiments disclosed and described herein.

Referring now to FIGS. 2 and 3, an embodiment of apparatus 200 for forming laminated glass is shown. The apparatus 200 includes an upper distributor 212 positioned centrally over a lower distributor 222. The upper distributor 212 has a channel 214 formed longitudinally there along bounded by sidewalls 215 comprising longitudinally linearly extending upper dam or weir surfaces 216 and outer sidewall surfaces 217 that terminate at their lower ends 218 in spaced relation above the lower distributor 222. The channel 214 has a sloping bottom surface 219, which tapers upwardly from an inlet end of the distributor fed by a glass delivery pipe 220, to the weir surfaces 216 at the opposite end of the distributor. A pair of end dams 221 extends across channel 214 and limits the longitudinal extent of the overflow therefrom.

The lower distributor 222 also is provided with an upwardly open longitudinally extending overflow channel 224 bounded by sidewalls 225 having longitudinally extending linear upper weir or dam surfaces 226 and substantially vertical outer sidewall surfaces 227. The channel 224 is provided with a sloping bottom surface 229 that extends upwardly from an inlet end provided with a glass delivery pipe 230 to the upper weir surfaces 226 at the opposite end of the distributor 222. A pair of end dams 231, which extends across the ends of overflow channel 224, not only confine the longitudinal flow over weir surfaces 226, but also provide a minimum space between the bottom edges 218 of the outer sidewall surfaces 217 of upper distributor 212 and the upper weir or dam surfaces 226 of lower distributor 222 allowing for the overflow of glass from the lower distributor. The upper and lower distributors are independently supported, and they may be adjusted relative to each other as desired. It will be noted that the lower edges 218 of the sidewalls 215 of upper distributor 212 are substantially parallel to the upper weir surfaces 226 of the lower distributor 222.

The lower distributor 222 has a wedge-shaped sheet glass forming member portion 232 provided with a pair of downwardly converging forming surfaces 224 that communicate at their upper ends with the lower ends 228 of outer sidewall surfaces 227, and convergingly terminate at their lower end in a root portion or draw line 236.

In the operation of the apparatus shown in FIGS. 2 and 3, molten core layer glass 110 is delivered to the inlet end of channel 224 by means of glass delivery pipe 230. A low effective head of the core layer glass 110 is maintained and accordingly the molten material flows into the channel 224 without surge or agitation. The molten glass then wells upwardly over the parallel upper dam or weir surfaces 226 of the channel 224, divides, and flows down the outer side surfaces 227 of each sidewall 225, and then flows downwardly along each of the oppositely disposed converging forming surfaces 234 of the glass forming portion 232. Simultaneously, molten clad glass 121 is delivered to the inlet end of channel 214 by means of glass delivery pipe 220 wherein the molten material wells over the parallel upper dam or weir surfaces 216 of the channel 214, divides, and flows down each outer sidewall surface 217 of the sidewalls 215 and onto the upper surface of the core layer 110, where it flows downwardly along outer surface portions 240 of the core layer 110. At the bottom of the wedge-shaped sheet forming member portion 232, the separate laminated flows rejoin to form a single composite or laminated sheet 100 having a core layer 110 and clad layers 121a and 121b on each side of the core layer 110.

Once the laminated glass article 100 has been formed, compressive stress may be introduced in the laminated glass article 100 by chemical strengthening processes, such as an ion exchange treatment. In embodiments, the chemical strengthening process comprises an ion exchange treatment including immersing the laminated glass article 100 in a molten salt bath containing large ions, such as $K^+$ or $Na^+$, to be exchanged with small ions in the glass matrix, such as $Na^+$ or $Li^+$. As used herein, "large ions" refers to ions that are greater in size than ions initially in the glass matrix. By way of example, ion exchange of alkali metal-containing glasses may be achieved by immersing the laminated glass article 100 in at least one molten salt bath containing a salt, such as nitrates, sulfates, and chlorides of the large alkali metal ion. In some embodiments, the molten salt bath is molten $KNO_3$, molten $NaNO_3$, or mixtures thereof. In some embodiments, the temperature of the molten salt bath is from about 380° C. to about 450° C., and immersion times are from about 2 hours to about 16 hours. In other embodiments, ion exchange treatments include applying an ion exchange medium to one or more surfaces of the laminated glass article. The ion exchange medium comprises a solution, a paste, a gel, or another suitable medium comprising large ions to be exchanged with small ions in the glass matrix. By replacing small ions in the glass matrix with large ions at the surface of the laminated glass, compressive stress is formed as the glass cools and the large ions are pushed together. Such compressed surfaces result in strengthened glass that is more resistant to damage than non-strengthened glass.

In addition to compressive stress values, DOL contributes to the strength of the laminated glass. For example, imperfections or inclusions that are present in part or in whole beyond the DOL (i.e., deeper into the clad layer and nearer to the core than the compressive stress layer) will not be under compressive stress and may result in damaging cracks in the glass article. Accordingly, it may be desirable to have a large DOL so that imperfections and inclusions in the clad layers 121a and 121b near the core of the laminated glass article are under compressive stress so that the imperfections will be less likely to result in damage to the glass article. Therefore, in embodiments, the DOL is the same or substantially the same as the thickness of the clad layers 121a or 121b.

In some embodiments, the DOL may be from about 8 µm to about 150 µm, such as from about 10 µm to about 120 µm. In other embodiments, the DOL may be from about 15 µm to about 100 µm, such as from about 20 µm to about 90 µm. In yet other embodiments, the DOL may be from about 25 µm to about 85 µm, such as from about 30 µm to about 80 µm. In still other embodiments, the DOL may be from about 35 µm to about 75 µm, such as from about 40 µm to about 70 µm. In some embodiments, the DOL is from about 45 µm to about 60 µm. In some embodiments, the DOL may be from about 8 µm to about 80 µm, such as from about 10 µm to about 60 µm, or even from about 25 µm to about 50 µm.

In embodiments, the clad layers 121a and 121b comprise a glass that is ion-exchangeable and the core 110 comprises a glass that is not substantially ion-exchangeable or not ion-exchangeable. Therefore, large ions, such as $K^+$ and $Na^+$, from the ion exchange medium will diffuse into the clad layers 121a and 121b and will not diffuse substantially into the core layer 110. Because the large ions from the ion exchange medium cannot diffuse substantially into the core layer 110, the large ions will more fully fill in the glass matrix of the clad layers 121a and 121b thereby creating high compressive stress deep into the compressive stress layer. As used herein, "into the glass article", "into the clad layer", or "into the compressive stress layer" indicates a direction from the outer surface of the glass article, clad layer, or compressive stress layer into the bulk of the glass article, clad layer, or compressive stress layer (i.e., toward an inner surface of the clad layer, which is directly adjacent to the core and opposite the outer surface).

In embodiments, the maximum compressive stress in the clad layers 121a and 121b of the laminated glass 100 may be from about 0.05 GPa to about 0.7 GPa, such as from about 0.1 GPa to about 0.65 GPa. In some embodiments, the maximum compressive stress in the clad layers of the laminated glass may be from about 0.15 GPa to about 0.6 GPa, such as from about 0.2 GPa to about 0.55 GPa. In other embodiments, the maximum compressive stress in the clad layers of the laminated glass may be from about 0.25 GPa to about 0.5 GPa, such as from about 0.3 GPa to about 0.45 GPa. In yet other embodiments, the maximum compressive stress in the clad layers of the laminated glass may be from about 0.35 GPa to about 0.4 GPa.

In embodiments discussed above, laminated glass articles are subjected to an ion exchange process to form a compressive stress layer in the clad layers 121a and 121b of the laminated glass article. However, ion exchanging a laminated glass article may lead to issues with frangible behavior. Without being bound by any particular theory, it is believed that subjecting a laminated glass article to an ion exchange process causes high compressive stress values at the surface of the clad layer. The high compressive stress values at the surface of the clad layer combined with tensile stresses in the core layer can lead to high stored energy in the core. This stored energy in the core can cause the glass article to have frangible behavior that may not be acceptable for some end-use applications.

Frangible behavior (also referred to herein as "frangibility") refers to extreme fragmentation behavior of a glass and is described in U.S. Pat. No. 8,075,999, which is incorporated herein by reference in its entirety. Frangible behavior is the result of development of excessive internal or central tension within the laminated glass article, resulting in forceful or energetic fragmentation of the laminated glass article upon fracture. In laminated or chemically strengthened glass articles, frangible behavior can occur when the balancing of compressive stresses in a surface or outer region of the laminated glass article with tensile stress in the center of the laminated glass article provides sufficient energy to cause multiple cracks branching with ejection or "tossing" of small glass pieces and/or particles from the article. The velocity at which such ejection occurs is a result of the excess energy within the laminated glass article, stored as central tension.

The frangibility of a glass article is a function of central tension, DOL, and compressive stress. In particular, the central tension within a glass article can be estimated from the compressive stress for a glass having a stress profile that is shaped as a complimentary error function or linearly shaped. Compressive stress is measured near the surface (i.e., within 100 µm), giving a maximum compressive stress value and a measured DOL. The relationship between compressive stress (CS) and central tension (CT) is given by the expression in equation (1):

$$CT \approx (CS \cdot DOL)/(t-2DOL) \quad (1),$$

wherein t is the thickness of the glass article. Unless otherwise specified, central tension CT and compressive stress CS are expressed herein in megaPascals (MPa), whereas thickness t and depth of layer DOL are expressed in millimeters. The DOL and the maximum value of compressive stress CS that should be designed into or provided to a glass article are limited by such frangible behavior. Consequently, frangible behavior is one consideration to be taken into account in the design of various laminated glass articles.

Accordingly, a glass may be designed to have a central tension at or below a critical or threshold central tension for the glass article to avoid frangibility upon impact with another object, while taking both compressive stress and DOL into account. The threshold central tension is based upon experimentally observed behavior. The threshold central tension (TCT) may be described by the expression in equation (2):

$$TCT\ (MPa) = -38.7\ (MPa/mm) \cdot \ln(t)\ (mm) + 48.2\ (MPa) \quad (2).$$

Using equation (2), the central tension of a laminated glass article may be controlled so that it is not greater than the TCT.

As shown in equation (1) reducing the compressive stress value in the compressive stress layer, such as by using a polluted ion exchange medium, lowers the central tension of the laminated glass article. A central tension below the TCT decreases the frangibility of the laminated glass article to a point acceptable for most uses. In embodiments, the central tension of a laminated glass article is from about 30 MPa to about 50 MPa, such as from about 35 MPa to about 45 MPa. In other embodiments, the central tension of a laminated glass article is about 40 MPa.

As stated above, the central tension of a glass article may be controlled by limiting the compressive stress value in a compressive stress layer and/or by limiting the DOL. However, as shown in equation (1) there is a direct relationship between the compressive stress value and the central tension of a laminated glass article, whereas there is an indirect relationship between DOL and the central tension of a laminated glass article. Therefore, in embodiments, it may be desirable to lower the compressive stress value so that the central tension of the laminated glass article is below the TCT. One way to achieve a lower compressive stress value, according to embodiments, is to perform the ion exchange process with a polluted ion exchange medium.

A polluted ion exchange medium is an ion exchange medium that contains ions of similar or smaller size to the ions in the glass matrix of the laminated glass article. For example, if $K^+$ ions from the ion exchange medium are to be exchanged with $Na^+$ ions in the matrix of a laminated glass article, a polluted ion exchange medium may contain $Li^+$, $Na^+$, and $K^+$ ions. Because the concentration of $K^+$ ion is lower in a polluted ion exchange medium than in a non-polluted ion exchange medium, there will be fewer large $K^+$ ions in the polluted ion exchange medium to be exchanged into the glass matrix for the smaller $Na^+$ ions. Thus, thus the compressive stress value of the compressive stress layer will be decreased as the number of $K^+$ ions exchanged for $Na^+$ ions in the glass matrix is decreased. In embodiments, polluted ion exchange mediums are obtained by reusing ion exchange mediums that have previously been used in an ion exchange process. For example, a molten bath of pure $KNO_3$ may initially be used as an ion exchange medium to exchange $K^+$ ions from the ion exchange medium for $Na^+$ ions in the glass matrix. After this initial use, the molten salt bath will be polluted and comprise $K^+$ ions that were not utilized in the initial ion exchange and $Na^+$ ions that were removed from the glass matrix during the initial ion exchange. Thus, this used, polluted ion exchange medium may be used as the ion exchange medium in embodiments.

Alternatively, in other embodiments, a polluted ion exchange medium may be formed by mixing together differing nitrates, sulfates, or phosphates, such as, for example, a mixture of $KNO_3$ and $NaNO_3$. The percentages of components in a polluted ion exchange bath may vary depending on the desired compressive stress values. The lower the concentration of large ions in the ion exchange medium, the lower the compressive stress value is in the compressive stress layer of the laminated glass article. In embodiments, the concentration of large ions (e.g., $K^+$ ions) in the ion exchange medium may be less than or equal to about 95%, such as less than or equal to about 90%. In other embodiments, the concentration of large ions in the ion exchange medium may be less than or equal to about 85%, such as less than or equal to about 80%. In still other embodiments, the concentration of large ions in the ion exchange medium may be less than or equal to about 75%, such as less than or equal to about 70%. In embodiments, the concentration of large ions in the ion exchange medium is greater than or equal to about 50%, such as greater than or equal to about 55%.

The average coefficient of thermal expansion (CTE) of the glass pairs used for the clad layer and the core layer also may be considered to adjust the maximum compressive stress in the compressive stress layer. As used herein, the term "average coefficient of thermal expansion" refers to the average coefficient of thermal expansion of a given material or layer between 0° C. and 300° C. As used herein, the term "coefficient of thermal expansion" refers to the average coefficient of thermal expansion unless otherwise indicated. For example, ion-exchangeable glasses generally have larger CTE (e.g., about 8 ppm/° C.) than glass that are not ion-exchangeable (e.g., about 3 ppm/° C.). During the fusion draw process, this CTE mismatch can result in a core layer that has compressive stresses and clad layers that have tensile stresses, which is the opposite of what is desired in embodiments. However, in some embodiments, small amounts of tensile stress in the clad layer that are present before the ion exchange process are not problematic and may be beneficial to lower the compressive stress in the clad layer, which will lower the central tension of the laminated glass article. For example, if the clad layer comprises a small amount of tensile stress, the compressive stress created by the ion exchange may be reduced by a corresponding or substantially corresponding amount. Accordingly, in embodiments, the core glass and the clad glass are selected so that the CTE of the core glass is the same or substantially the same as the CTE of the clad glass before the ion exchange process. In other embodiments, the CTE of the core glass is slightly lower than the CTE of the clad glass before the ion exchange process. In embodiments, the CTE of the core glass may be lower than the CTE of the clad glass by an amount from about 0 ppm/° C. to about 2 ppm/° C., such as by an amount from about 0.5 ppm/° C. to about 1.5 ppm/° C.

Figure 4:
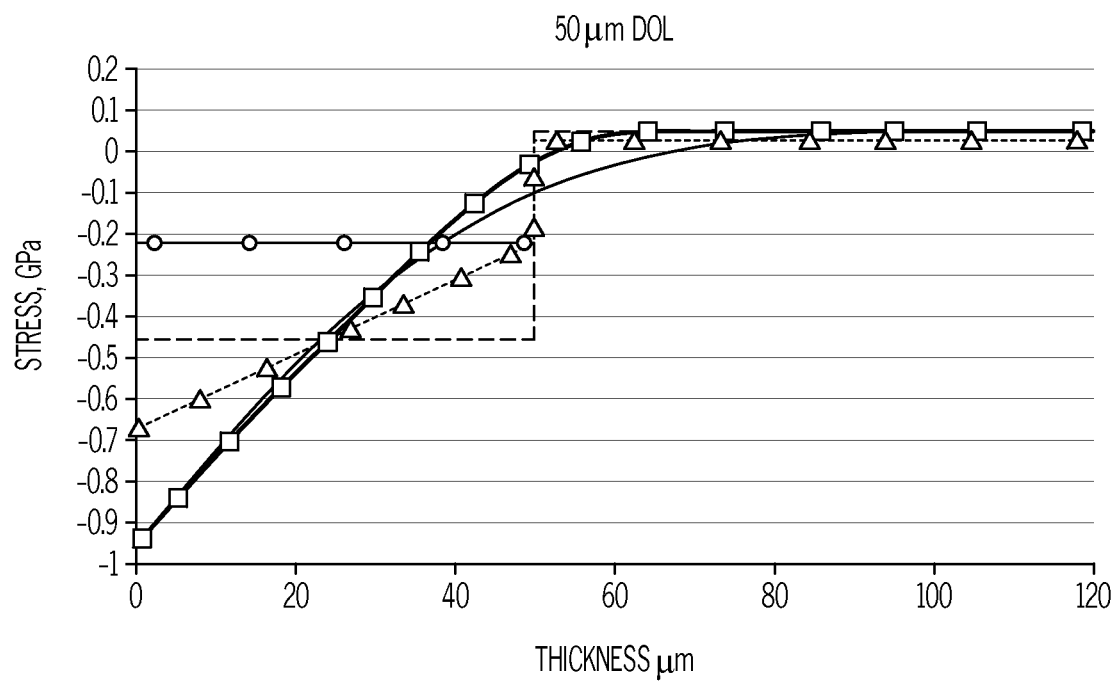
FIG. 4 is a graph depicting stress profiles for glass articles having compressive stress layers with a thickness of about 50 μm.

FIG. 4 graphically depicts modeled stress profiles for ion-exchanged glass using the complimentary and linear error functions, and the stress profiles for laminated glass articles having a 50 μm thick clad layer. Each stress profile represents the stress within the glass article as a function of depth within the glass article, measured from the outer surface. It should be noted that the stress profiles shown herein include one compressive stress layer (e.g., clad layer) and a portion of a tensile stress layer (e.g., core layer). In some embodiments, the glass article comprises another compressive stress layer (e.g., another clad layer) opposite the tensile stress layer. For example, the stress profile of the glass article is symmetrical. Stress profile 1, which is depicted by a solid line in FIG. 4, is a stress profile of an ion-exchanged glass having a thickness of about 120 μm and a DOL of about 50 μm using a complimentary error function. The stress profile 2, which is depicted by squares in FIG. 4, is a stress profile of an ion-exchanged glass having a thickness of about 120 μm and a DOL of about 60 μm using a linear error function. Each of these two stress profiles are based on profiles of ion-exchangeable glasses that are subjected to an ion exchange process in a molten $KNO_3$ bath at about 430° C. for a duration of about 30 minutes. As shown in FIG. 4, stress profile 1 and stress profile 2 have very high compressive stress at the surface of the compressive stress layer (as indicated by the magnitude of the negative number) that decreases rapidly to a compressive stress of 0 at the DOL (i.e., about 50 μm for profile 1 and about 60 μm for profile 2). For example, stress profile 1 has a maximum compressive stress at a surface of the compressive stress layer of about −0.95 GPa. Similarly, stress profile 2 depicted in FIG. 4 has a maximum compressive stress at the surface of the compressive stress layer of about −0.95 GPa. Each of these stress profiles is based upon mathematical modeling. Thus, an actual stress profile of an ion-exchanged glass article is expected to be between these two stress profiles.

Stress profile 3, which is a previously available laminated glass article that is formed by the fusion draw process and is not ion-exchanged, is depicted by circles in FIG. 4. The compressive stress at the surface in stress profile 3 is much lower than in both of the ion-exchanged stress profile 1 and stress profile 2. However, stress profile 3 comprises a flat portion where the compressive stress at the surface of the compressive stress layer is the same (about −0.22 GPa) as the compressive stress at the DOL (i.e., about 50 μm). Further, the stress profile in the core is flat indicating that the tensile stress is the same (i.e., about 0.02 GPa) from a surface of the core to the center of the core. Stress profile 3 shows a glass article that beneficially provides compressive stress deep in the DOL (e.g., at about 40 μm to about 50 μm), which provides resistance to deep imperfections in the clad layer. Comparatively, the stress profiles 1 and 2 provide less compressive stress deep in the DOL. Thus a glass article having a stress profile corresponding to stress profile 3 may be better at preventing deep imperfections from causing damaging cracking of the glass article than glass articles having a stress profile corresponding to stress profile 1 or 2. However, to make a glass article having a stress profile corresponding to stress profile 3 by fusion drawing, the maximum compressive stress in the compressive stress layer is kept low when compared to stress profiles 1 and 2, and may not be a sufficient stress to prevent relatively shallow imperfections from becoming damaging cracks.

Stress profile 4 is a hypothetical stress profile of a laminated glass article that has undergone ion exchange and is depicted by a dashed line in FIG. 4. The hypothetical stress profile 4 represents an ideal stress profile that has a stored energy that substantially matches the stored energy of stress profiles 1 and 2, thus a glass having stress profile 4 has about the same frangibility as a glass having stress profile 1 or 2. For example, stress profile 4 has the same area under the curve in its compressive stress region as stress profiles 1 and 2, and thus, the stored energy and central tension of stress profile 4 is about the same as an ion-exchanged glass that is not laminated. However, unlike stress profiles 1 and 2, stress profile 4 has a flat portion in the compressive stress region, which shows compressive stress deep into the compressive stress layer. Further, stress profile 4 has a higher compressive stress than the similarly shaped stress profile 3. For example, the compressive stress at the surface of the compressive stress layer in stress profile 4 is about −0.45 GPa, which is constant throughout the DOL. Like stress profile 3, stress profile 4 provides compressive stress deep into the glass article that can help to prevent imperfections in the glass at these depths from forming cracks that can cause unacceptable damage to the glass article. However, producing a laminated glass article having stress profile 4 may be difficult using a conventional forming process because it would require a relatively large CTE mismatch, such as greater than 10 ppm/° C., between the core and the clad glass.

Stress profile 5 is a stress profile of a laminated glass article according to embodiments disclosed herein and is depicted by triangles in FIG. 4. As discussed regarding stress profiles 1-4, there is a desire to form a glass article with a stress profile that has relatively high compressive stress at both the outer surface of the compressive stress layer and at the inner surface of the compressive stress layer, such as by obtaining a glass with a stress profile similar to the hypothetical stress profile 4. The glass of stress profile 5 addresses this by ion exchanging a laminated glass article having a clad layer that comprises ion-exchangeable glass and a core layer that comprises glass that is not ion-exchangeable, and conducting an ion exchange process that fills or substantially fills the clad layer of the laminated glass article with large ions. However, as shown in stress profiles 1 and 2, the ion exchange process does not generate flat stress profiles, as desired, but generates stress profiles with a steep decrease in compressive stress near the surface of the compressive stress layer. Therefore, the glass of stress profile 5 does not have a flat stress profile, as is shown in stress profiles 3 and 4. Rather, a trade-off is made in the stress profile 5 between high compressive stress at the surface and a flat compressive stress profile. The resulting stress profile 5 is substantially linearly sloped or linearly sloped through its compressive stress layer (i.e., the clad layer), and has a flat tension stress in its core layer. Stress profile 5 does not provide a surface compressive stress that is as high as the compressive stress in stress profiles 1 and 2, but the compressive stress at the inner surface of the compressive stress layer in stress profile 5 is higher than the compressive stress deep in the compressive stress layer in stress profiles 1 and 2. Further, there is more compressive stress at the surface of the compressive stress layer in stress profile 5 than in stress profile 3. Thus, a glass with stress profile 5 can help to prevent imperfections from becoming damaging cracks in the clad layer of the laminated glass article at both the outer surface of the clad layer and at the inner surface of the clad layer.

Figure 5:
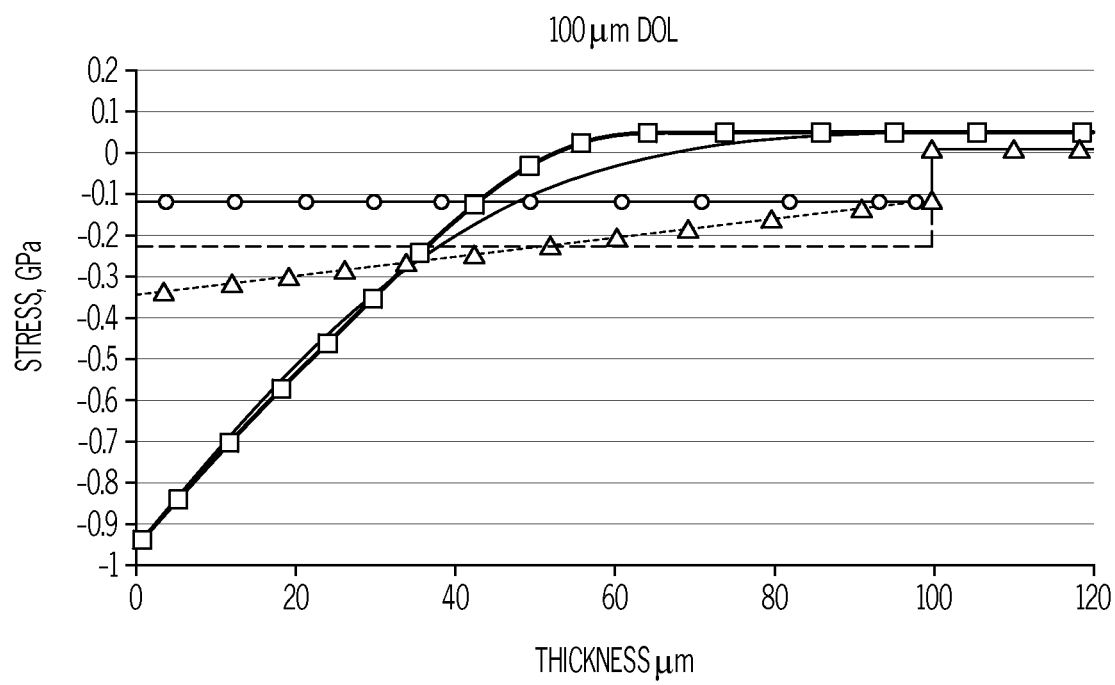
FIG. 5 is a graph depicting stress profiles for glass articles having compressive stress layers with a thickness of about 100 μm.

FIG. 5 graphically depicts modeled stress profiles for ion-exchanged glass using the complimentary and linear error functions, and the stress profiles for laminated glass articles having a 100 μm thick clad layer. Stress profile 6, which is similar to stress profile 1 and is depicted by a solid line in FIG. 5, is a stress profile of an ion-exchanged glass having a thickness of about 120 μm and a DOL of about 50 μm using a complimentary error function. Stress profile 7, which is similar to stress profile 2 and is depicted by squares in FIG. 5, is a stress profile of an ion-exchanged glass having a thickness of about 120 μm and a DOL of about 60 μm using a linear error function. Each of these two stress profiles is based on profiles of ion-exchangeable glasses that are subjected to an ion exchange process in a molten $KNO_3$ bath at about 430° C. for a duration of about 30 minutes. As shown in FIG. 5, stress profile 6 and stress profile 7 have very high compressive stress at the surface of the compressive stress layer (as indicated by the magnitude of the negative number) that decreases rapidly to a compressive stress of 0 at the DOL. For example, stress profiles 6 and 7 have a maximum compressive stress at a surface of the compressive stress layer of about −0.95 GPa. Each of these stress profiles is based upon mathematical modeling. Thus, an actual stress profile of an ion-exchanged glass article is expected to be between these two stress profiles.

Stress profile 8, which is a previously available laminated glass article that is formed by the fusion draw process and is not ion-exchanged, is depicted by circles in FIG. 5. The compressive stress at the surface in stress profile 8 is much lower than in both of the ion-exchanged stress profile 6 and stress profile 7. However, stress profile 8 comprises a flat portion where the compressive stress at the surface of the compressive stress layer is the same (about −0.12 GPa) as the compressive stress at the inner surface of the compressive stress layer (i.e., about 100 μm). Further, the stress profile in the core is flat indicating that the tensile stress is the same (i.e., about 0.02 GPa) from a surface of the core to the center of the core. Stress profile 8 shows a glass article that beneficially provides compressive stress deep in the DOL, which provides resistance to deep imperfections in the clad layer. Comparatively, the stress profiles 6 and 7 provide relatively lower compressive stress deep in the DOL. Thus a glass article having a stress profile corresponding to stress profile 8 may be better at preventing deep imperfections from causing damaging cracking of the glass article compared to glass articles having a stress profile corresponding to stress profile 6 or 7. However, to make a glass article having a stress profile corresponding to stress profile 8 by fusion drawing, the compressive stress in the compressive stress layer is kept relatively low when compared to stress profiles 6 and 7, and may not be a sufficient stress to prevent relatively shallow imperfections from becoming damaging cracks.

Stress profile 9 is a hypothetical stress profile of a laminated glass article that has undergone ion exchange and is depicted by a dashed line in FIG. 5. The hypothetical stress profile 9 represents an ideal stress profile that has a stored energy that substantially matches the stored energy of stress profiles 6 and 7. Thus, a glass having stress profile 9 has about the same frangibility as a glass having stress profile 6 or 7. For example, stress profile 9 has the same area under the curve in its compressive stress region as stress profiles 6 and 7. Thus, the stored energy and central tension of stress profile 9 is about the same as an ion-exchanged glass that is not laminated. However, unlike stress profiles 6 and 7, stress profile 9 has a flat portion in the compressive stress region, which shows compressive stress deep into the compressive stress layer. Further, stress profile 9 has a higher compressive stress than the similarly shaped stress profile 8. For example, the compressive stress at the surface of the compressive stress layer in stress profile 9 is about −0.22 GPa, which is constant throughout the DOL. Like stress profile 8, stress profile 9 provides compressive stress deep into the glass article that will prevent imperfections in the glass at these depths from forming cracks that can cause unacceptable damage to the glass article. However, like stress profile 4 discussed above, forming a laminated glass article having stress profile 9 may be difficult using a conventional forming process.

Stress profile 10 is a stress profile of a laminated glass article according to embodiments disclosed herein and is depicted by triangles in FIG. 5. As discussed regarding stress profiles 6-9, there is a desire to form a glass article with a stress profile that has relatively high compressive stress at both the outer surface of the compressive stress layer and at the inner surface of the compressive stress layer adjacent to the core layer and opposite the outer surface, such as by obtaining a glass with a stress profile similar to the hypothetical stress profile 9. The glass of stress profile 10 addresses this by ion exchanging a laminated glass article having a clad layer that comprises ion-exchangeable glass and a core layer that comprises glass that is not ion-exchangeable, and conducting an ion exchange process that fills or substantially fills the clad layer of the laminated glass article with large ions. However, as shown in stress profiles 6 and 7, the ion exchange process does not generate flat stress profiles, as desired, but generates stress profiles with a steep decrease in compressive stress near the surface of the compressive stress layer. Therefore, the glass of stress profile 10 does not have a flat stress profile, as is shown in stress profiles 8 and 9. Rather, a trade-off is made in the stress profile 10 between high compressive stress at the surface and a flat compressive stress profile. The resulting stress profile 10 is substantially linearly sloped or linearly sloped through its compressive stress layer (i.e., the clad layer), and has a flat tension stress in its core layer. Stress profile 10 does not provide a surface compressive stress that is as high as the compressive stress in stress profiles 6 and 7, but the compressive stress in stress profile 10 remains higher deeper into the glass article than in stress profiles 6 and 7. Further, there is more compressive stress at the outer surface of the compressive stress layer in stress profile 10 than in stress profile 8. Thus, a glass with stress profile 10 may prevent imperfections from becoming damaging cracks in the clad layer of the laminated glass article at both the surface of the clad layer and relatively deep into the glass article.

Figure 6:
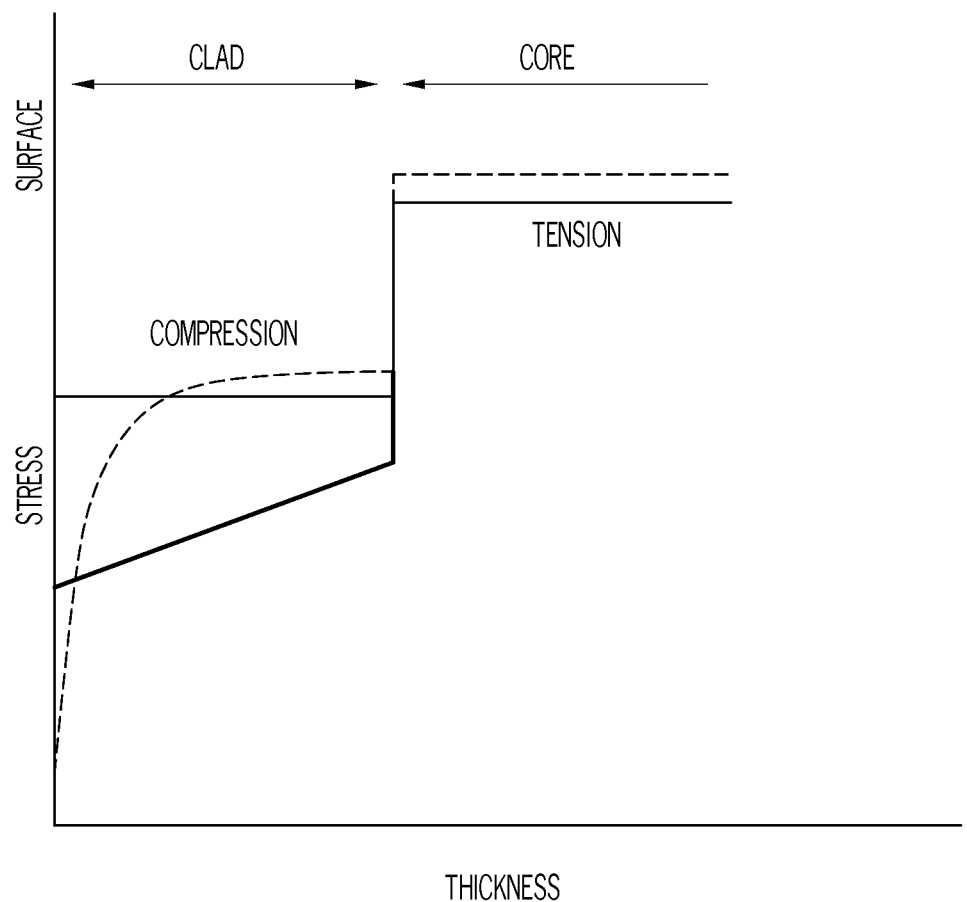
FIG. 6 is a graph depicting stress profiles of laminated glass articles formed with conventional ion exchange processes and laminated glass articles formed according to embodiments disclosed and described herein.

FIG. 6 graphically depicts a comparison of laminated glass articles according to embodiments disclosed herein and laminated glass articles that are ion-exchanged according to conventional methods. In conventional methods, a laminated glass article that is mechanically strengthened, such as by mismatching the CTE between the core layer and the clad layers, can be subjected to an ion exchange process with a pure ion exchange medium for a short period of time. This ion exchange process introduces a high compressive stress near the surface of the clad layer and little or no compressive stress deep into the clad layer. The stress profile of a conventional laminated article that has been ion-exchanged is shown by the dotted line in FIG. 6. The stress profile in the clad layer of conventional laminated glass articles, as shown in FIG. 6, is a curve similar to the ion exchange stress profiles of Examples 1, 2, 6, and 7 in FIGS. 4 and 5, where a large compressive stress is present at the surface of the compressive stress layer and the compressive stress rapidly degrades so that there is no, or almost no, compressive stress deeper into the clad layer. The shape of this stress profile is indicative of a dependence on mechanical strengthening in combination with chemical strengthening. For example, chemical strengthening, such as ion exchange, is conducted to increase the compressive stress at the surface of the clad layer. However, mechanical strengthening, which generally provides lower stresses than chemical strengthening, is relied on to introduce stress deep in the clad layer. Therefore, the stress profile created by conventional methods has a large compressive stress at the surface of the clad layer, which is provided by an ion exchange process with a short duration and pure ion exchange medium, that decreases rapidly to a portion of the clad layer where little or no ion exchange occurs and the stresses are provided by mechanical strengthening, such as CTE mismatch.

In contrast, stress profiles of laminated glass article formed according to embodiments disclosed herein, as indicated by a solid line in FIG. 6, have a lower compressive stress at the surface of the compressive stress layer than laminated, ion-exchanged glass articles made by conventional methods, but have larger compressive stress deeper into the glass article than the laminated, ion-exchanged glass articles made by conventional methods. The stress profile for the laminated glass article according to embodiments shown in FIG. 6 is achievable because it does not rely solely on mechanical strengthening of the laminated glass article, such as CTE mismatch. Rather, the stress provided in the clad layer is provided by an ion exchange process that has a relatively long duration and is conducted with a polluted ion exchange medium. This process allows a more complete ion exchange throughout the clad layer, which results in a slow decrease in the compressive stress from the surface of the clad layer and across the clad layer. The core, which is not ion-exchangeable, provides a barrier for the ion exchange and allows the central tension of the laminated glass article to be controlled, such as by controlling the compressive stress and the DOL, as disclosed above.

As discussed above, embodiments of laminated glass articles disclosed herein provide relatively high compressive stress deep into the compressive stress layer. As shown in FIGS. 4-6, the slope of the stress profile for laminated glass articles according to embodiments is linear or substantially linear. As used herein, "substantially linear" means that the slope of the stress profile in the clad layer is nearly constant. In some embodiments, the slope of any region of the stress profile in the clad layer may deviate from an average slope of the stress profile in the clad layer by less than about 20%, such as by less than about 15%. In other embodiments, the slope of the stress profile at any region in the clad layer may deviate from an average slope of the stress profile in the clad layer by less than about 10%, such as by less than about 5%. For example, in some embodiments, the stress profile between the compressive stress at the outer surface of the glass article and the compressive stress at the inner surface of the compressive stress layer (e.g., the clad layer) is a straight line. Additionally, or alternatively, the stress profile at all points through the compressive stress layer is within about 10%, within about 5%, or within about 2% of a straight line between the compressive stress at the outer surface of the glass article and the compressive stress at the inner surface of the compressive stress layer.

There is a decrease in compressive stress from the outer surface of the clad layer to the inner surface of the compressive stress layer (i.e., the maximum thickness of the clad layer). However, to provide sufficient compressive stress deep into the compressive stress layer, the decrease of the compressive stress across the clad layer is limited in embodiments. In embodiments, the compressive stress at the maximum thickness of the clad layer is from about 20% to about 45% of the compressive stress at the surface of the clad layer, such as from about 25% to about 40% of the compressive stress at the surface of the clad layer. In other embodiments, the compressive stress at the maximum thickness of the clad layer is from about 30% to about 35% of the compressive stress at the surface of the clad layer, such as about 33% of the compressive stress at the surface of the clad layer.

The glass articles described herein can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; for lighting or signage (e.g., static or dynamic signage) applications; or for transportation applications including, for example, rail and aerospace applications.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A laminated glass article comprising:
    a core layer comprising a glass that is substantially free of alkali metals, whereby the glass of the core layer is not substantially ion-exchangeable; and
    a clad layer comprising a glass having a substantial amount of one or more alkali metals, whereby the glass of the clad layer is ion-exchangeable, wherein:
    a maximum compressive stress in the clad layer is from about 0.05 GPa to about 0.7 GPa,
    a compressive stress at an inner surface of the clad layer directly adjacent to the core layer is from about 20% to about 45% of a compressive stress at an outer surface of the clad layer,
    a slope of the stress profile of the laminated glass article is substantially linear throughout the clad layer; and
    the slope of any region of the stress profile in the clad layer deviates from an average slope of the stress profile in the clad layer by less than about 20%.

2. The laminated glass article according to claim 1, wherein the maximum compressive stress in the clad layer is from about 0.35 GPa to about 0.4 GPa.

3. The laminated glass article according to claim 1, wherein the compressive stress at the inner surface of the clad layer is from about 30% to about 35% of the compressive stress at the outer surface of the clad layer.

4. The laminated glass article according to claim 1, wherein the compressive stress at the inner surface of the clad layer is about 33% of the compressive stress at the outer surface of the clad layer.

5. The laminated glass article according to claim 1, wherein the slope of any region of the stress profile in the clad layer deviates from an average slope of the stress profile in the clad layer by less than about 15%.

6. The laminated glass article according to claim 1, wherein a thickness of the clad layer is from about 8 μm to about 150 μm.

7. The laminated glass article according to claim 1, wherein a coefficient of thermal expansion (CTE) of the core layer is lower than a CTE of the clad layer by an amount from about 0 ppm/° C. to about 2 ppm/° C.

8. The laminated glass article according to claim 1, wherein a central tension of the laminated glass article is from about 30 MPa to about 50 MPa.

9. The laminated glass article according to claim 1, wherein the laminated glass article comprises multiple clad layers.

\* \* \* \* \*